Patented Sept. 22, 1942

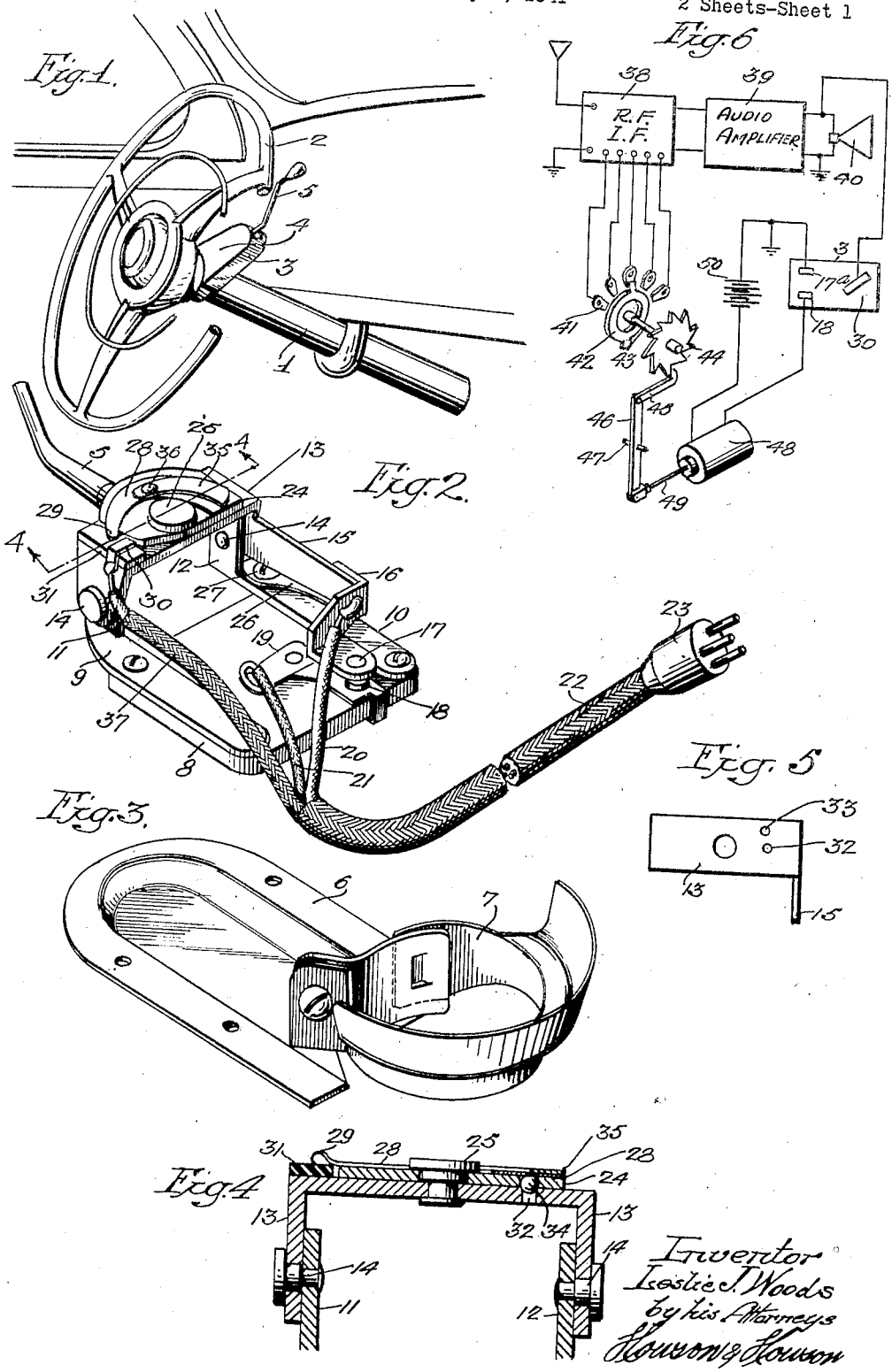

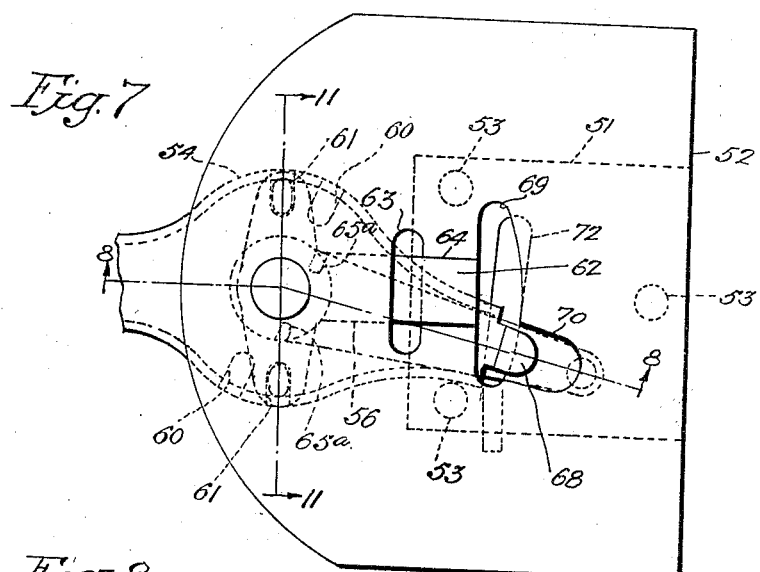
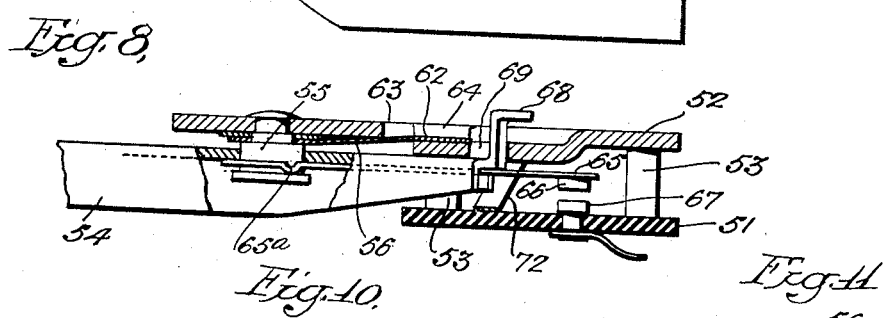
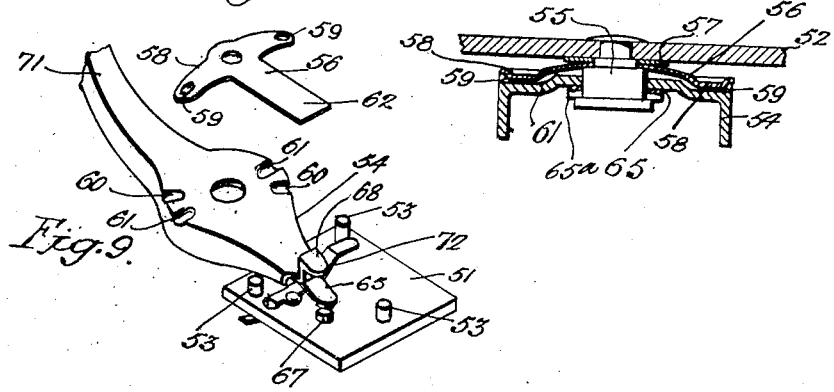

2,296,755

UNITED STATES PATENT OFFICE 2,296,755

RADIO CONTROL DEVICE

Leslie J. Woods, Grosse Pointe, Mich., assignor to Philco Radio and Television Corporation, Philadelphia, Pa., a corporation of Delaware Application May 6, 1941, Serial No. 392,146

15 Claims. (Cl. 250—14)

This invention relates to control devices for radio receivers, and more particularly to control devices for automobile radio receivers.

One object of the invention is to provide a radio control device which is simple in construction and which may be operated with very little effort on the part of the operator.

Another object of the invention is to provide a control device for an automobile radio receiver which may be operated in a very simple manner without requiring the automobile operator to remove his hand from the steering wheel.

A further object of the invention is to provide a novel control device comprising a manual control member arranged for selective movement in different directions or planes and adapted to effect different radio control functions by its different movements.

Still another object of the invention is to provide a device of this character in which the manual control member effects tuning of the radio receiver by its movement in one direction or plane and is spring biased against such movement, and the said member effects muting of the radio receiver by its movement in another direction or plane and is retained in its muting position until it is moved therefrom.

A still further object of the invention is to provide a device of this character having a lever arm movable in two directions or planes substantially at right angles to one another, and which is particularly adapted for use in conjunction with the steering wheel of an automobile, one direction of movement preferably being substantially perpendicular to the general plane of the steering wheel and the other direction of movement being substantially parallel to the plane of the steering wheel.

Other objects and features of the invention will be apparent as the description proceeds.

In the accompanying drawings:

Fig. 1 is a perspective view of the steering column and wheel of an automobile or motor vehicle having associated therewith the device of the present invention;

Fig. 2 is a fragmentary perspective view of the control device with its base and cover removed;

Fig. 3 is a perspective view of the supporting base and associated clamp;

Fig. 4 is a detailed sectional view taken along line 4—4 of Fig. 2 and illustrating the retaining means for holding the control member in either the tuning or the muting positions;

Fig. 5 is a detail view further illustrating such retaining means;

Fig. 6 is a diagrammatic illustration of a radio receiver adapted to be controlled by the device;

Fig. 7 is a fragmentary plan view of an alternative embodiment of the invention with the housing removed;

Fig. 8 is a sectional view taken along line 8—8 of Fig. 7;

Fig. 9 is a perspective view illustrating more clearly the principal elements of the device;

Fig. 10 is a perspective view of the biasing spring; and

Fig. 11 is a detail sectional view taken along line 11—11 of Fig. 7.

Referring first to Fig. 1, there is shown the usual steering column 1 and steering wheel 2 of an automobile or motor vehicle, a portion of the steering wheel being broken away for clarity of illustration. The control device 3 provided by the present invention is attached to the steering column in proximity to the steering wheel. This device comprises a housing 4 within which the operating parts are disposed and a manually operable lever 5 extending from the housing and terminating adjacent to the rim of the steering wheel for operation by a hand of the vehicle operator without requiring removal of the hand from the steering wheel. As will be described in detail hereinafter, the lever arm 5 is pivotally movable in two directions or planes, one substantially perpendicular to the general plane of the steering wheel and the other substantially parallel to the plane of the wheel. By these movements, the lever arm 5 functions through the operating mechanism now to be described to effect tuning and muting of the radio receiver controlled by the device.

Referring now to Figs. 2 to 4, the base plate 6 which supports the operating mechanism has a mounting clamp 7 at one end thereof which is adapted to snugly embrace the steering column 1 and thus securely mount the device, as illustrated in Fig. 1. The operating mechanism of the device is constructed as an integral unit, as shown in Fig. 2. The parts of the mechanism are attached to an insulating plate 8 which is secured to the base plate 6 by mounting screws or the like. A suitable cover encloses the operating mechanism, as shown in Fig. 1.

Referring particularly to Fig. 2, a pair of L-shaped metal brackets 9 and 10 are secured to the insulating plate 8, as illustrated. The upstanding arms 11 and 12 of these brackets serve to pivotally support an inverted U-shaped metallic member 13 by means of pivot pins 14 (see Fig. 4). Member 13 has an extending arm 15, to the end of which is secured a small bracket 16 carrying a contact button 17. A second contact button 18 is mounted in cooperative relation with the contact 17 by means of a contact terminal 19 secured to the insulating plate 8. Conductors 20 and 21 are connected respectively to the contact-carrying elements 16 and 19 and extend into a common cable 22 having a connector plug 23 at the end thereof.

A metallic plate 24 is pivotally mounted on member 13 (see Fig. 4) by means of a pivot pin 25 whose axis is substantially at right angles to the axes of pivot pins 14. The plate 24 carries the lever arm 5 so that the said arm is mounted for pivotal movement in one direction or plane about the pivot 25. It will be noted also that the arm 5 is pivotally movable through elements 13 and 24 about the pivots 14. The latter movement of the arm in a direction to close contacts 17 and 18 is resisted by a leaf spring 26 having one arm secured to bracket 10 at 27 and having its free end in engagement with arm 15. Thus the spring 26 biases arm 5 and the associated parts to a normal position such that the contacts 17 and 18 are maintained open.

Plate 24 has secured thereto an arcuate spring contact element 28 having an extending upturned end 29 which is adapted to engage an associated contact 30 carried by an insulating block 31 secured to member 13. Arm 5 is movable about pivot 25 between two positions, in one of which the contacts 29 and 30 are open, while in the other position these contacts are closed. The arm is retained in either of these positions by means of the spring-pressed ball retainer illustrated in Figs. 4 and 5. Member 13 is provided with spaced apertures 32 and 33, each of which is adapted to receive a ball 34, loosely seated in an aperture in plate 24, as shown in Figs. 4 and 5. The arcuate contact member 28 holds the ball 34 in place but slight movement of the ball upward to free it from either of the openings 32 and 33 is permitted against the action of a leaf spring 35 (see Fig. 2). The elements 28 and 35 may be secured to plate 24 by means of a common rivet 36. It will be seen that the plate 24 and arm 25 carried thereby may be moved about pivot 25 between two positions established by the apertures 32 and 33, and the arm 5 will be maintained in either of these positions by the spring-pressed ball 34.

Contact member 28 is electrically connected through plate 24 and member 13 to conductor 20. Contact 30 is connected to a conductor 37 which extends into the cable 22. This conductor is provided with a metallic outer sheath, as illustrated.

From the foregoing description, it will be seen that when the device is mounted for operation as illustrated in Fig. 1, movement of the arm 5 toward the steering wheel about pivots 14 will close contacts 17 and 18. As will be described presently, repeated movement of arm 5 in this manner so as to effect intermittent closure of contacts 17 and 18 serves to tune the radio receiver to a desired signal. It will be obvious that this movement of arm 5 may be easily performed by one hand of the operator without removing the hand from the rim of the steering wheel. In fact, this movement of arm 5 may be performed with a single finger of the hand, as will be readily apparent.

When it is desired to mute the radio receiver, the arm 5 may be rotated about pivot 25 so as to close contacts 29 and 30. This movement of arm 5 may also be performed without removing the hand from the steering wheel and, in fact, this movement may also be effected by a single finger. As may be seen from Fig. 2, the tuning operation may be performed with arm 5 in either its muting or non-muting position. This feature of the device is illustrated in Figs. 2 to 5.

By means of the plug 23, the control device may be electrically connected to a radio receiver situated remotely with respect to the control device. For example, the receiver may be mounted on the dashboard of the motor vehicle, as will be well understood. A suitable receptacle (not shown) may be provided at the receiver to receive the plug 23.

Referring now to Fig. 6, the radio receiver, the control device, and the electrical connections are illustrated diagrammatically. The radio receiver may be of conventional form. For example, it may take the form of the usual superheterodyne receiver comprising a high and intermediate frequency section 38, an audio amplifier section 39 and loud-speaker 40. The receiver may further comprise pretuned selectable circuits by means of which it may be tuned to any one of a plurality of predetermined signals, as well known in the art. The selection of the pretuned circuits may be effected by means of a step-by-step switch comprising spaced contacts 41 and a movable contact wheel 42 or the like which may be driven through shaft 43 by a ratchet wheel 44. The latter may be actuated by a pawl 45 carried by an arm 46 pivoted at 47 and arranged for actuation by a solenoid 48 whose armature is connected to arm 46 through link 49.

The control device provided by the present invention is shown schematically. Since the contacts 17 and 28 are electrically connected together, as will be clear from the above description, a single contact designated 17a in Fig. 6 is representative of both of these contacts. In the operation of the device, as described above, the contact 17a is movable into engagement with the fixed contacts 18 and 30. When the contact 17a engages contact 18, the solenoid 48 is energized from a suitable source 50 which may be provided by the usual power supply of such a receiver. Successive and repeated closure of the contacts 17a and 18 by manipulation of the manual control arm will cause repeated energization of the solenoid so as to effect step-by-step movement of the switch 41—42 and thus effect the desired tuning of the receiver.

When it is desired to mute the radio receiver, contacts 17a and 30 are brought into engagement by proper manipulation of the control arm and the closure of these contacts serves to short circuit the output of the receiver, as will be well understood.

Referring now to Figs. 7 to 11, there is illustrated an alternative embodiment of the control device. In this instance, there is provided an insulating plate 51 upon which the operating parts are mounted. The plate 51 may be secured to a suitable base plate (not shown) similar to the base plate 6 of the previously-described embodiment and a suitable cover may be provided. Only the operating mechanism of the device is illustrated, it being deemed unnecessary to illustrate the housing and mounting means which are generally similar to those of the first embodiment.

A metallic plate 52 is mounted above and in spaced relation to insulating plate 51 by means of supporting pins 53. A manually-movable lever 54 is pivotally suspended from plate 52 by means of a pin or stud 55. The lever 54 is loosely carried by stud 55 and a leaf spring 56 also carried by the stud is interposed between member 54 and a bearing element in the form of a washer 57, as shown in Fig. 11. The leaf spring 56 is generally T-shaped, as shown in Fig. 10, and the portion 58 thereof is downwardly bowed with its free ends engaging member 54. The said ends of portion 58 are depressed to form downwardly-extending projections 59 which are adapted to seat in recesses 60 or 61 provided on the upper face of member 54. This structure serves to define two positions of member 54 in its rotation about the pivot 55. The extending portion 62 of spring 56 extends through a slot 63 in plate 52 and the end of said portion is seated in a depression 64 of the said plate. Thus the spring is anchored against rotary movement.

Since member 54 is loosely carried by stud 55, it may be rocked about the pivotal stud in a direction or plane substantially at right angles to the direction or plane of the above-mentioned motion. This rocking movement of member 54 is opposed by the spring 56 which serves to bias the said member to the position illustrated in Fig. 8.

A resilient contact arm 65 is also carried by stud 55 and is disposed within the channeled member 54 and extends from the narrowed end thereof. Arm 65 carries a contact 66 which is adapted to engage an associated contact 67 mounted on the insulating plate 51. These contacts are aligned with one another when the pivotal member 54 is in the position illustrated in Figs. 7 to 9. Arm 65 is provided with indentations (see Figs. 7 and 8) which render it effective to oppose the rocking movement of member 54. Thus, the contact arm serves additionally as a biasing means. An inverted L-shaped extension 68 on member 54 extends through a slot 69 in plate 52, and the said plate is recessed at 70 to accommodate the said extension when the member 54 is in the position illustrated. That is to say, the recess 70 into which the portion 68 may seat, permits rocking movement of member 54 to close contacts 66 and 67. However, when the member 54 is rotated about pivot 55 to its other position, rocking movement of the said member is prevented by the abutment of portion 68 with the upper surface of plate 52.

The contacts 66 and 67 constitute the tuning contacts and the rocking movement of member 54 to intermittently close these contacts is effected manually by the extending handle portion 71 of the said member. As in the previous embodiment, the extending handle or lever terminates in proximity to the steering wheel when the device is mounted on the steering column.

A spring contact element 72 is mounted on the insulating plate 51 and its free end is engageable by the contact member 65 whenever the member 54 is rotated to its position other than that shown. In such position of member 54, the contacts 66 and 67 will be permanently disengage and the receiver will be muted by the closure of contacts 65 and 72. Thus, with reference to the illustration of Fig. 6, the movable contact 65 corresponds to contact 17a, contact 67 corresponds to contact 18, and contact 72 corresponds to contact 30. In the use of the second embodiment of the invention, therefore, the connections leading to the contact elements will correspond to the connections of Fig. 6.

It will be seen from the foregoing description that the alternative embodiment of the invention does not permit tuning of the receiver while it is muted since, as noted above, the tuning contacts 66 and 67 are inoperable when the arm 71 is moved to the muting position. In all other respects, however, the alternative embodiment is similar to the first-described embodiment and is operated in the same manner, the manual-operating member 71 being arranged for movement in two directions or planes substantially at right angles to one another to effect the tuning and muting functions.

It will be understood that the invention is not limited to the specific forms illustrated and described, but is capable of further embodiments or modifications within the scope of the appended claims.

I claim:

1. A control device for a radio receiver, comprising a manual control member arranged for arcuate movement in two directions substantially perpendicular to one another, biasing means for returning said member after each movement in one of said directions, means for retaining said member in its different positions of movement in the other direction, means operable by the movement of said member in said one direction for effecting a certain radio control function, and means operable by the movement of said member in said other direction for effecting a different radio control function.

2. A control device for a radio receiver, comprising a pivoted lever arm arranged for selective pivotal movement in two planes substantially perpendicular to one another, biasing means for returning said arm after each movement in one of said planes, means for retaining said arm in its different positions of movement in the other plane, means operable by the pivotal movement of said arm in said one plane for effecting a certain radio control function, and means operable by the pivotal movement of said arm in said other plane for effecting a different radio control function.

3. A control device for a radio receiver, comprising a manually-operable arm movable between two positions in a single plane and also movable laterally of said plane when disposed in either of said positions, means operable by the lateral movement of said arm in either of said positions for effecting a certain radio control function, and means operable by movement of said arm to one of said positions only for effecting a different radio control function.

4. A control device for a radio receiver, comprising a manually-operable member movable between two positions in a single plane and also movable laterally of said plane when disposed in either of said positions, means for retaining said member in either of said positions, biasing means for returning said member after each lateral movement thereof, means operable by the lateral movement of said member in either of said positions for effecting a certain radio control function, and means operable by movement of said member to one of said positions only for effecting a different radio control function.

5. In a radio receiver, means including a multi-position device for tuning the receiver to different signals, electrical means for actuating said device to its successive positions in response to repeated energization of the electrical means, normally inoperative means for muting the receiver, manual control means including a member arranged for selective movement in different directions, biasing means for returning said member after each movement in one of said directions, means for retaining said member in its different positions of movement in another direction, means responsive to movement of said member in said one direction for energizing said electrical means, and means responsive to movement of said member in said other direction for rendering said muting means operative.

6. The combination with an automobile steering column and wheel, of a control device for a radio receiver comprising means for mounting the device on the steering colum in proximity to the steering wheel, a pivoted lever arm extending from the device and terminating adjacent the rim of the steering wheel for pivotal movement by a hand of the operator while engaging the wheel, and means operable by said lever arm for effecting a radio control function.

7. The combination with an automobile steering column and wheel, of a control device for a radio receiver comprising means for mounting the device on the steering column in proximity to the steering wheel, a pivoted lever arm extending from the device and terminating adjacent the rim of the steering wheel for pivotal movement by a hand of the operator while engaging the wheel, means for biasing said lever arm to one position, and means operable by each movement of said lever arm to another position for effecting a radio control function.

8. The combination with an automobile steering column and wheel, of a control device for a radio receiver comprising means for mounting the device on the steering column in proximity to the steering wheel, an arm extending from said device and mounted for selective pivotal movement in two planes, one substantially perpendicular to the general plane of the steering wheel and the other substantially parallel to the plane of said wheel, said arm terminating adjacent the rim of the steering wheel for ready operation by a hand of the operator, means operable by the movement of said arm in one plane for effecting a certain radio control function, and means operable by the movement of said arm in the other plane for effecting a different radio control function.

9. The combination with an automobile steering column and wheel, of a control device for a radio receiver comprising means for mounting the device on the steering column in proximity to the steering wheel, an arm extending from said device and mounted for selective pivotal movement in two planes, one substantially perpendicular to the general plane of the steering wheel and the other substantially parallel to the plane of said wheel, said arm terminating adjacent the rim of the steering wheel for ready operation by a hand of the operator, biasing means for returning said arm to its initial position after each movement thereof in the first-mentioned plane, means for retaining said arm in its different positions of movement in said other plane, means operable by the movement of said arm in said first-mentioned plane for effecting a radio tuning function, and means operable by the movement of said arm in the other plane for effecting a radio muting function.

10. The combination with an automobile steering wheel, of a control device for a radio receiver comprising a manual control member located in proximity to the rim of the steering wheel, said member being movable arcuately in substantial conformity with the curvature of said rim and being also movable laterally of its arcuate movement, means operable by the arcuate movement of said member for effecting a certain radio control function, and means operable by the lateral movement of said member for effecting a different radio control function.

11. The combination with an automobile steering wheel, of a control device for a radio receiver comprising a manual control member located in proximity to the rim of the steering wheel, said member being movable arcuately in substantial conformity with the curvature of said rim between two positions and being also movable laterally of its arcuate movement when in either of said positions, means operable by the arcuate movement of said member to one of said positions for effecting a radio muting function, and means operable by the lateral movement of said member when in either of said positions for effecting a radio tuning function.

12. The combination with an automobile steering wheel, of a control device for a radio receiver comprising a manual control member located in proximity to the rim of the steering wheel, said member being movable arcuately in substantial conformity with the curvature of said rim between two positions and being also movable laterally of its arcuate movement when in either of said positions, radio muting means operable by the arcuate movement of said member to one of said positions, radio tuning means adapted for step-by-step actuation to tune said receiver to successive stations, and means operable by repeated lateral movement of said member for actuating said tuning means.

13. A control device for a radio receiver, comprising a lever arm arcuately movable about a fixed pivot and arranged for rocking movement transversely of its plane of arcuate movement, means operable by the arcuate movement of said arm for effecting a certain radio control function, and means operable by the transverse rocking movement of said arm for effecting a different radio control function.

14. A control device for a radio receiver, comprising a lever arm arcuately movable about a fixed pivotal axis and arranged for rocking movement transversely of its plane of arcuate movement about a second fixed pivotal axis perpendicular to said first axis, means operable by the arcuate movement of said arm for effecting a certain radio control function, and means operable by the transverse rocking movement of said arm for effecting a different radio control function.

15. A control device for a radio receiver, comprising a lever arm arcuately movable about a fixed pivot and arranged for rocking movement about said pivot transversely of its plane of arcuate movement, means operable by the arcuate movement of said arm for effecting a certain radio control function, and means operable by the transverse rocking movement of said arm for effecting a different radio control function.

LESLIE J. WOODS.